May 15, 1923.
R. S. JACOBSEN
CONVEYER MECHANISM
Filed March 12, 1919
1,455,336
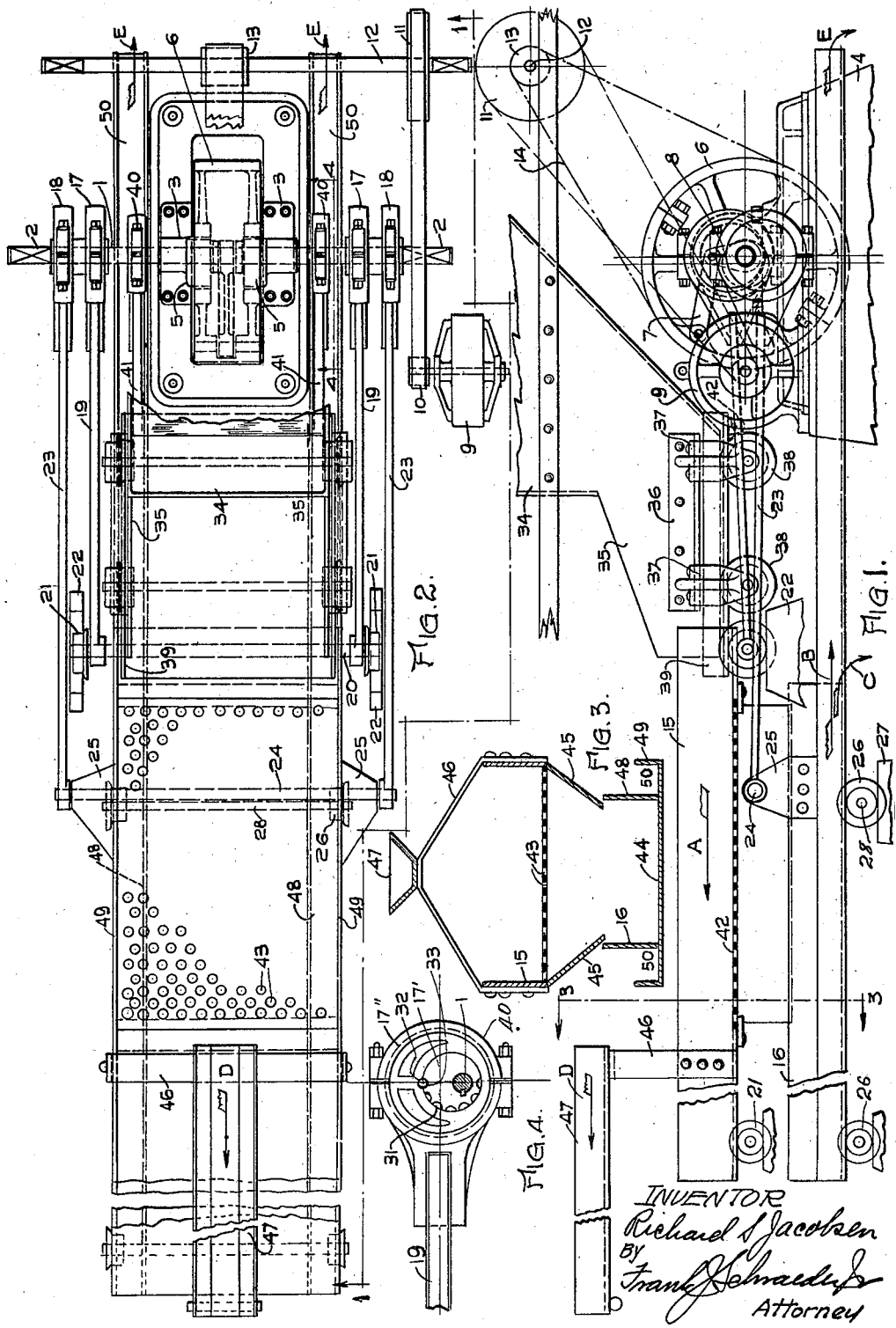
INVENTOR
Richard S Jacobsen
BY
Frank Schraeder
Attorney Patented May 15, 1923.

1,455,336

UNITED STATES PATENT OFFICE.

RICHARD S. JACOBSEN, OF CHICAGO, ILLINOIS, ASSIGNOR, BY MESNE ASSIGNMENTS, TO WEBSTER MFG. CO., A CORPORATION.

CONVEYER MECHANISM.

Application filed March 12, 1919. Serial No. 282,094.

*To all whom it may concern:*

Be it known that I, RICHARD S. JACOBSEN, a subject of the King of Norway, residing in the city of Chicago, in the county of Cook and State of Illinois, have invented new and useful Improvements in Conveyer Mechanisms, of which the following is a specification.

This invention relates to improvements in conveyer mechanism wherein horizontally or laterally reciprocating troughs are actuated with a motion which is progressively accelerated for the greater part of the forward stroke, then relatively quickly reversed and progressively decelerated in the backward or return stroke. The driving mechanism herein illustrated and preferably employed for reciprocating the conveyer troughs is described in my pending application for United States Letters Patent for means for operating reciprocating conveyers or screens, filed Sept. 11, 1916, Serial No. 119,554.

It is an object of the invention to simplify the structure of conveyer mechanism by actuating a plurality of conveyers and a filler for one of said conveyers from a common shaft.

Another object of the invention is to provide a drive for reciprocating conveyers and a filler wherein the rate of speed at which the conveyer receptacles and the filler move at different points of their travel varies.

It is also an object of the invention to provide a combination of conveyer receptacles with compartments facilitating the assorting operation of the material conveyed, one or several of the conveyer receptacles having extensions in which waste material may be conveyed to points different from that to which the valuable product is conveyed.

With these and other objects in view, an embodiment of the invention is illustrated in the accompanying drawing and is described in the following specification.

In the drawings—

Fig. 1 is a side elevation and partly section through a conveyer mechanism of this kind;

Fig. 2 is a top plan view of a conveyer plant:

Fig. 3 is a sectional view through a pair of conveyer receptacles on line 3—3 of Fig. 1, and Fig. 4 is a side elevation, partly section, on line 4—4 of Fig. 2, illustrating the mounting of the eccentrics.

The drive shaft 1, through the rotation of which reciprocating movement is imparted to the conveyer receptacles, is supported in outer bearings (diagrammatically indicated at 2), and in inner bearings 3, which are mounted upon a suitable foundation 4. These inner bearings are provided with an eccentric portion 5, on which a pulley 6 rotates. This pulley is driven at a uniform rate of speed about an axis eccentric to that of the drive shaft 1, and the uniform rotation of the pulley is communicated to the shaft 1 by means of a link 7, attached at one end to the pulley and at the other end to a crank arm 8, which is rigidly mounted on the drive shaft 1. Owing to this arm and link connection between pulley and drive shaft, the uniform rotation of the pulley is converted into a non-uniform rotation of the drive shaft. A prime mover, shown here in the form of an electric motor 9, carries a small pulley 10, from which, through belt transmission, a pulley 11 on a countershaft 12 is driven. The rotation of the shaft 12 takes place at a speed lower than the speed of the pulley 10, and a second reduction of speed is obtained by the second transmission, including the pulley 13 on the countershaft 12 and the belt 14, which is trained about the pulley 6.

Two conveyer receptacles, 15 and 16 respectively, receive reciprocating movement from the drive shaft 1, which,—as stated above,—is rotated at a non-uniform rate of speed. The means for actuating the conveyer receptacles 15 and 16 comprises eccentrics 17 and 18 respectively, which are mounted on the drive shaft 1, but which are offset with respect to each other in such manner that the movement of the conveyer 15 in one direction coincides with the movement of the conveyer receptacle 16 in the opposite direction. The connection between the eccentrics 17 with the conveyer receptacle 15 is established by means of connecting rods 19, secured to the eccentric 17 at one end and at the other end to a rod or axle 20, which is supported on the lower side of the conveyer receptacle 15. The outer ends of this axle carry rollers 21, which ride upon a suitable support 22, and similar rollers also are used for supporting the remote end of the upper conveyer receptacle 15.

The connection between the eccentrics 18 and the lower receptacle 16 is effected in a similar way through connecting rods 23, having their ends secured to a transverse bar 24, which is mounted in brackets 25 on the lower receptacle. This lower receptacle is supported on rollers 26, which ride on a suitable foundation 27, and which are interconnected by a bar 28, although a rigid connection of this bar with the lower receptacle is not necessary. The remote end of the lower receptacle 16 may be supported by similar rollers.

The construction of the conveyer mechanism as described does not form the present invention, nor is any claim directed to the connection of the eccentrics with the shaft. A detail of this connection is illustrated in Fig. 4, wherein the shaft 1 is surrounded by an eccentric disk 17′, on which a two-part eccentric ring 17″ is adjustably mounted. A variation of the throw is rendered possible owing to the provision of a plurality of notches 31 in the circumference of the eccentric disk 17′, which may be brought into registration with a notch 32 in the eccentric ring 17″. After suitable relative adjustment of the eccentric disk and the ring, the parts may be held in adjusted relation through the insertion of a locking pin 33 into the registering notches.

The material is supplied to the conveyer receptacle 15 through a spout 34, the lower end of which has lateral walls 35 to confine the discharge opening. Angle irons 36, mounted on the surface of these lateral walls 35, carry brackets 37, in the lower ends of which the rollers 38 are mounted. These rollers serve for supporting a trough or filler 39, which forms a movable bottom closure for the spout, and which is reciprocated to gradually transfer the charge poured into the spout 34 into the upper receptacle 15. The actuation of this filler 39 supported by the rollers 38 is effected from the common drive shaft 1 by means of eccentrics 40, which are connected through the rods 41 with a transverse bar 42, supported at the inner end of the filler 39. As shown in the drawing (Fig. 1), the eccentrics 40 have approximately the same relation to the eccentrics 18 actuating the lower conveyer receptacle 16 as the eccentrics 17 to the upper receptacle 15, although this is not essential. It is obvious that through suitable angular adjustment of the eccentrics 40 the filler 39 may be advanced in direction towards the upper receptacle 15 at the same time at which said upper receptacle is advanced in direction towards the filler 39, so that these two elements (the upper conveyer receptacle 15 and the filler 39) move in opposite direction.

The upper conveyer receptacle 15 is provided with a perforated bottom 42, whereby, through the reciprocating movement of this conveyer receptacle, the material transferred from the spout to the receptacle through the action of the filler 39 is automatically assorted. The material of a size small enough to drop through the perforations 43 is thrown upon the second receptacle 16, while material of excessive size is conveyed in direction of the arrow A, to be discharged at a suitable point. At the same time, however, the material thrown through the perforations of the bottom 43 upon a middle portion 44 of the lower receptacle 16 is conveyed in direction of the arrow B and may be discharged at the forward end of the bottom portion 44, as indicated by the arrow C. Lateral dispersion of the material dropping through the bottom 43 is prevented owing to the provision of skirts 45, which are fastened to the lower edge of the upper receptacle 15, and which converge, as shown in Fig. 3, towards the central portion 44 of the lower receptacle 16.

For the purpose of facilitating the assortment of that material which has not been screened in the upper conveyer and discharged at the point C of the lower conveyer, the following structure is provided: Brackets 46, attached to the upper receptacle 15 near the rear end of the perforated bottom 43, support centrally above said conveyer 15 a trough 47, to which, owing to this rigid connection, the same movement is imparted which is imparted to the upper receptacle 15. The lower receptacle 16, however, is provided with longitudinal partition walls 48 and with lateral walls 49, whereby at both sides of the central portion 44 channels 50 are formed, to which movement is imparted in the same direction as to the lower receptacle 16. The trough 47, as well as the channels 50, may serve for conveying additional material to different points of the plant; the material deposited in the trough 47 being conveyed in the direction of the arrow, while the material carried in the channels 50 will be discharged at the point E in the direction of the arrow indicated.

The operation of the conveyer mechanism as, for instance, used for conveying coal from a mine may be described as follows:

The mine run coal is poured into the spout 34, from which it is transferred, owing to the action of the filler 39, to the upper receptacle 15. The mine run disposed in said upper receptacle is screened, owing to the provision of the perforated bottom 42, and coal of proper size drops through the perforations of this bottom to the central portion 44 of the lower receptacle 16, from which it is discharged in direction of the arrow C, at the forward end of said central portion. Picker boys are stationed near the rear end of the upper receptacle 15, for the purpose of assorting that material which has not been screened through the bottom 43. Larger lumps of coal may be conveyed in direction of the arrow A to the rear end of the receptacle 15. The mine run, however, is not only formed of large and small lumps of valuable material, but it usually also contains material of less value (so-called "bone" coal) and material of no value (slate), which cannot be used. The picker boys will remove the lumps of material from the rear portion of the upper conveyer 15 and throw the bone coal, for instance, into the upper trough 47, which conveys the same to a point of discharge in the direction of the arrow B, while slate, stones, sulphur may be thrown by the picker boys into the compartments 50 of the lower receptacle 16, to be discharged at the forward end of these channels near the point E.

I claim:

1. In a conveyer mechanism, the combination of two superposed substantially horizontally disposed conveyer receptacles, means for simultaneously reciprocating said receptacles in different directions with a non-uniform movement, and separate compartments rigidly connected with said conveyer receptacles for conveying the refuse pickings in opposite directions.

2. In a conveyer mechanism, the combination of a pair of superposed substantially horizontally disposed conveyer receptacles, means for reciprocating the same simultaneously in opposite directions with a non-uniform movement, one of said conveyer receptacles being adapted to discharge into the other receptacle, and separate compartments connected with said receptacles.

3. In a conveyer mechanism, the combination of an upper conveyer screen, a lower conveyer having a central compartment located beneath said conveyer screen, a central elevated trough on the upper conveyer, and lateral compartments rigidly associated with the lower conveyer.

4. In a conveyer mechanism, the combination of a pair of substantially horizontally disposed conveyer receptacles, means for reciprocating the same with a motion to convey the material thereon, and separate trough compartments fixedly connected with each of said conveyer receptacles and located in different planes.

5. In a conveyer mechanism, the combination of a pair of superposed substantially horizontally disposed conveyer receptacles, and separate trough compartments rigidly connected with each of said conveyer receptacles located in planes different from those of the conveyers and different from each other, the materials in said compartments traveling in opposite directions.

6. In a conveyer mechanism, the combination of a pair of superposed conveyer receptacles, means for reciprocating said receptacles simultaneously in opposite directions, the upper receptacle adapted to discharge its screenings into the lower receptacle, a trough arranged centrally above the upper receptacle and secured thereto, and lateral compartments rigidly associated with said lower receptacle and extending therebeyond in the direction of material feed in the lower receptacle.

7. In a conveyer mechanism, the combination of a pair of superposed conveyer receptacles, means for reciprocating said receptacles simultaneously in opposite directions and with a non-uniform movement, the upper receptacle adapted to discharge its screenings into the lower receptacle, a trough arranged centrally above the upper receptacle and secured thereto, and lateral compartments rigidly associated with said lower receptacle and extending therebeyond in the direction of material feed in the lower receptacle.

8. In a conveyer mechanism, the combination of a pair of superposed conveyer receptacles, means for simultaneously reciprocating said receptacles in opposite directions, the upper receptacle adapted to discharge its screenings into the lower receptacle, and a separate trough mounted above the upper receptacle and propelled thereby.

9. A conveyer mechanism as embodied in claim 8, and including a lateral compartment associated with said lower receptacle and actuated thereby for separately conveying material therein.

10. In a conveyer mechanism, the combination of a substantially horizontally reciprocating upper conveyer screen, a substantially horizontally reciprocating lower conveyer having an intermediate compartment, an elevated trough above the upper conveyer and propelled thereby.

11. A conveyer mechanism as embodied in claim 10, and including a lateral compartment rigidly mounted on the lower conveyer.

12. In a conveyer mechanism, the combination of a substantially horizontally reciprocating upper conveyer screen, a substantially horizontally reciprocating lower conveyer beneath said upper conveyer screen, mechanism for operating said upper and lower conveyers with opposite conveying motions, and a separate compartment supported on the said lower conveyer for separately conveying material in the same direction as the lower conveyer.

In witness whereof, I have hereunto subscribed my name this 10th day of March, 1919.

RICHARD S. JACOBSEN.